United States Patent
Ray et al.

(10) Patent No.: US 9,173,183 B1
(45) Date of Patent: Oct. 27, 2015

(54) METHOD AND SYSTEM FOR DETERMINING TIME SYNCHRONIZATION ERRORS IN TIME DIFFERENCE OF ARRIVAL (TDOA) MEASUREMENTS

(71) Applicant: Sprint Spectrum L.P., Overland Park, KS (US)

(72) Inventors: Amar Nath Ray, Shawnee, KS (US); Warren B. Cope, Olathe, KS (US); Lyle Paczkowski, Mission Hills, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 296 days.

(21) Appl. No.: 13/896,113

(22) Filed: May 16, 2013

(51) Int. Cl.
*H04W 4/02* (2009.01)
*H04W 56/00* (2009.01)

(52) U.S. Cl.
CPC .................................. *H04W 56/0065* (2013.01)

(58) Field of Classification Search
None
See application file for complete search history.

(56) References Cited

U.S. PATENT DOCUMENTS

| 5,815,538 A | 9/1998 | Grell et al. |
| 6,185,429 B1 * | 2/2001 | Gehrke et al. ................. 455/502 |
| 6,353,412 B1 | 3/2002 | Soliman |
| 2011/0065451 A1 * | 3/2011 | Danado et al. ............. 455/456.1 |

OTHER PUBLICATIONS

European Telecommunications Standards Institute, "LTE Positioning Protocol (LPP)", ETSI TS 136 355, V11.0.0, Oct. 2012.

* cited by examiner

*Primary Examiner* — Philip Sobutka

(57) ABSTRACT

A mobile device may obtain time difference of arrival (TDOA) measurements from wireless signals transmitted by a plurality of nodes. The plurality of nodes may include synchronized nodes that are synchronized to a time reference and an unsynchronized node that has a time synchronization error relative to the time reference. An estimated location of the mobile device can be determined based on the TDOA measurements. Another estimated location of the mobile device can be determined based on other data, such as the mobile device scanning an object having a known location. The time synchronization error can then be determined based on a distance between these estimated locations. Once the time synchronization error has been determined, it can be used to correct subsequent TDOA measurements involving the unsynchronized node.

17 Claims, 7 Drawing Sheets

METHOD AND SYSTEM FOR DETERMINING TIME SYNCHRONIZATION ERRORS IN TIME DIFFERENCE OF ARRIVAL (TDOA) MEASUREMENTS

BACKGROUND

Signals from satellite-based positioning systems, such as the Global Positioning System (GPS), are often used to determine locations of mobile devices. GPS signals, however, are not always received reliably, such as when the receiver is located inside a building. In addition, the accuracy of GPS location fixes for many receivers is no better than about 10 meters.

As an alternative to GPS, wireless signals transmitted by terrestrial signal sources can be used to determined locations of mobile devices. In one approach, a terrestrial signal source transmits a wireless signal that includes an indication of its transmission time. A mobile device receives the wireless signal at a reception time. The difference between the reception time and the transmission time is the time it took for the wireless signal to propagate from the signal source to the mobile device. The propagation time can then be related to the distance between the mobile device and the signal source based on the speed of light. If distances between the mobile device and multiple signal sources are determined in this way, the location of the mobile device can be determined by triangulation. This approach, however, is subject to error when the mobile device's time reference is not synchronized with the signal source's time reference.

In an alternative approach, a mobile device can receive a first wireless signal transmitted by a first signal source and a second wireless signal transmitted by a second signal source, with each of the first and second wireless signals including a respective indication of its transmission time. Based on the transmission times and reception times of the respective wireless signals, the mobile device can calculate a difference between the propagation times for the wireless signals transmitted by the first and second signal sources. The propagation time difference is often described as a "Time Difference of Arrival" (TDOA) measurement. Based on the speed of light, the TDOA measurement can be used to define a set of possible locations for the mobile device. Typically, the possible locations lie on hyperbolas having foci corresponding to the locations of the two signal sources used for the TDOA measurement. The mobile device may also obtain one or more additional TDOA measurements, based on wireless signals transmitted by one or more additional pairs of signal sources, to define one or more additional sets of possible locations for the mobile device. The location of the mobile device may then be calculated based on where the sets of possible locations (e.g., hyperbolas) defined by the TDOA measurements intersect.

The TDOA approach has an advantage in that it reduces or eliminates mobile-device time synchronization errors associated with the mobile device using a time reference that is not synchronized with that of the signal sources. For example, by calculating a propagation time difference, the mobile-device time synchronization errors in the individual propagation times from the signal sources can cancel out. Nonetheless, the calculated propagation time difference can be subject to signal-source time synchronization error if the two signal sources are not synchronized to the same time reference. Thus, signal sources used for TDOA measurements are typically synchronized to the same time reference, such as a time reference based on GPS signals, in order to avoid signal-source time synchronization errors.

OVERVIEW

In a first aspect, example embodiments provide a method. The method involves receiving, by a location server, a first time difference of arrival (TDOA) measurement obtained by a mobile device. The first TDOA measurement relates to wireless signals transmitted from a first node and a second node and received by the mobile device. The first and second nodes are synchronized to a time reference. The method also involves receiving, by the location server, a second TDOA measurement obtained by the mobile device. The second TDOA measurement relates to wireless signals transmitted from the first node and a third node and received by the mobile device. The third node is mobile and has a time synchronization error relative to the time reference. The method further involves the location server receiving additional location-determination data obtained by the mobile device, determining a location of the third node, and determining the time synchronization error based on at least the first TDOA measurement, the second TDOA measurement, the additional location-determination data, and the location of the third node.

In a second aspect, example embodiments provide a method. The method involves scanning an object, by a mobile device, to obtain scan data and, in response to scanning the object, obtaining, by the mobile device, a first TDOA measurement and a second TDOA measurement. The first TDOA measurement relates to wireless signals transmitted from a first node and a second node and received by the mobile device. The second TDOA measurement relates to wireless signals transmitted from the first node and a third node and received by the mobile device. The first and second nodes are synchronized to a time reference. The third node has a time synchronization error relative to the time reference. The method further involves the mobile device obtaining a first estimated location of the mobile device based on at least the first TDOA measurement and the second TDOA measurement, obtaining a second estimated location of the mobile device based on at least the scan data, and determining the time synchronization error based on a distance between the first estimated location and the second estimated location.

In a third aspect, example embodiments provide a system that includes a processor, data storage, and program instructions stored in the data storage. The program instructions are executable by the processor to cause the system to perform functions comprising: (a) obtaining a first time difference of arrival (TDOA) measurement, wherein the first TDOA measurement relates to wireless signals transmitted from a first node and a second node and received by a mobile device, wherein the first and second nodes are synchronized to a time reference; (b) obtaining a second TDOA measurement, wherein the second TDOA measurement relates to wireless signals transmitted from the first node and a third node and received by the mobile device, wherein the third node is mobile, and wherein the third node has a time synchronization error relative to the time reference; (c) obtaining scan data relating to a scan of an object by the mobile device; (d) obtaining a first estimated location of the mobile device based on at least the first TDOA measurement and the second TDOA measurement; (e) obtaining a second estimated location of the mobile device based on at least the scan data; and (f) determining the time synchronization error based on a distance between the first estimated location and the second estimated location.

DETAILED DESCRIPTION

1. Introduction

The inventors have recognized that it is not always possible or practical to have all of the signal sources that a mobile devices uses for TDOA measurements to be synchronized to the same time reference. For example, a mobile device may obtain TDOA measurements from wireless signals transmitted from a plurality of nodes that includes synchronized nodes that are synchronized to a time reference and an unsynchronized node that has a time synchronization error relative to the time reference. The unsynchronized node may not be synchronized to the time reference because it is mobile, because it does not receive GPS signals that are used for the time reference (e.g., the node may be located inside of a building), or for some other reason. The unsynchronized node's time synchronization error can introduce a certain amount of error into the estimated location of the mobile device that is determined based on the TDOA measurements obtained by the mobile device.

However, if the unsynchronized node's time synchronization error does not change too rapidly over time, the time synchronization error can be determined at one point in time and remain valid for at least a certain period of time thereafter. The time synchronization error that is determined for the unsynchronized node can be used to correct subsequent TDOA measurements that are obtained using wireless signals from the unsynchronized node, thereby enabling more accurate location determinations.

In one approach, the unsynchronized node's time synchronization error can be determined by comparing a location determined using TDOA measurements and a location determined using other means. For example, a mobile device may obtain TDOA measurements using wireless signals transmitted by the unsynchronized node and wireless signals transmitted by synchronized nodes. An estimated location of the mobile device can be determined based on these TDOA measurements. Another estimated location of the mobile device can be determined based on other data, such as the mobile device scanning an object having a known location. The time synchronization error can then be determined based on a distance between the two estimated locations. Once the time synchronization error has been determined, it can be used to correct subsequent TDOA measurements involving the unsynchronized node.

Figure 1:
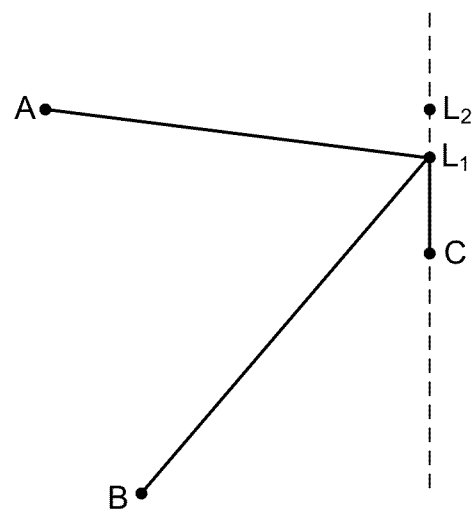
FIG. 1 is a diagram illustrating the effect of time synchronization error when an unsynchronized node is used for TDOA measurements, in accordance with an example embodiment.

FIG. 1 is a diagram that illustrates the effect of an unsynchronized node's time synchronization error. In the example of FIG. 1, a mobile device receives wireless signals from nodes A, B, and C. The point labeled "$L_1$" shows a location of the mobile device that may be determined based on TDOA measurements obtained from these wireless signals. The location indicated by $L_1$ would not, however, be accurate if nodes A, B, and C are not all synchronized to the same time reference. In this regard, FIG. 1 illustrates an example in which nodes A and B are synchronized to the same time reference, but node C is not. Thus, node C has a time synchronization error relative to the time reference to which nodes A and B are synchronized. Because of node C's time synchronization error, $L_1$ is not the actual location of the mobile device. Instead, the actual location of the mobile device could be either closer to node C or farther from node C. For example, the actual location of the mobile device could be at the point labeled "$L_2$" in FIG. 1. Points C, $L_1$, and $L_2$ are collinear, as indicated by the dotted line in FIG. 1. The distance between point $L_1$ (the location of the mobile device determined using TDOA measurements) and point $L_2$ (the actual location of the mobile device) is attributable to the time synchronization error of node C. Thus, in one approach, $L_1$ could be determined based on TDOA measurements, $L_2$ could be determined based on other data, and $T_E$, the time synchronization error of node C could be determined based on the distance, D, between $L_1$ and $L_2$ and the speed of light, c, as follows: $T_E = D/c$.

2. Example Network

Figure 2:
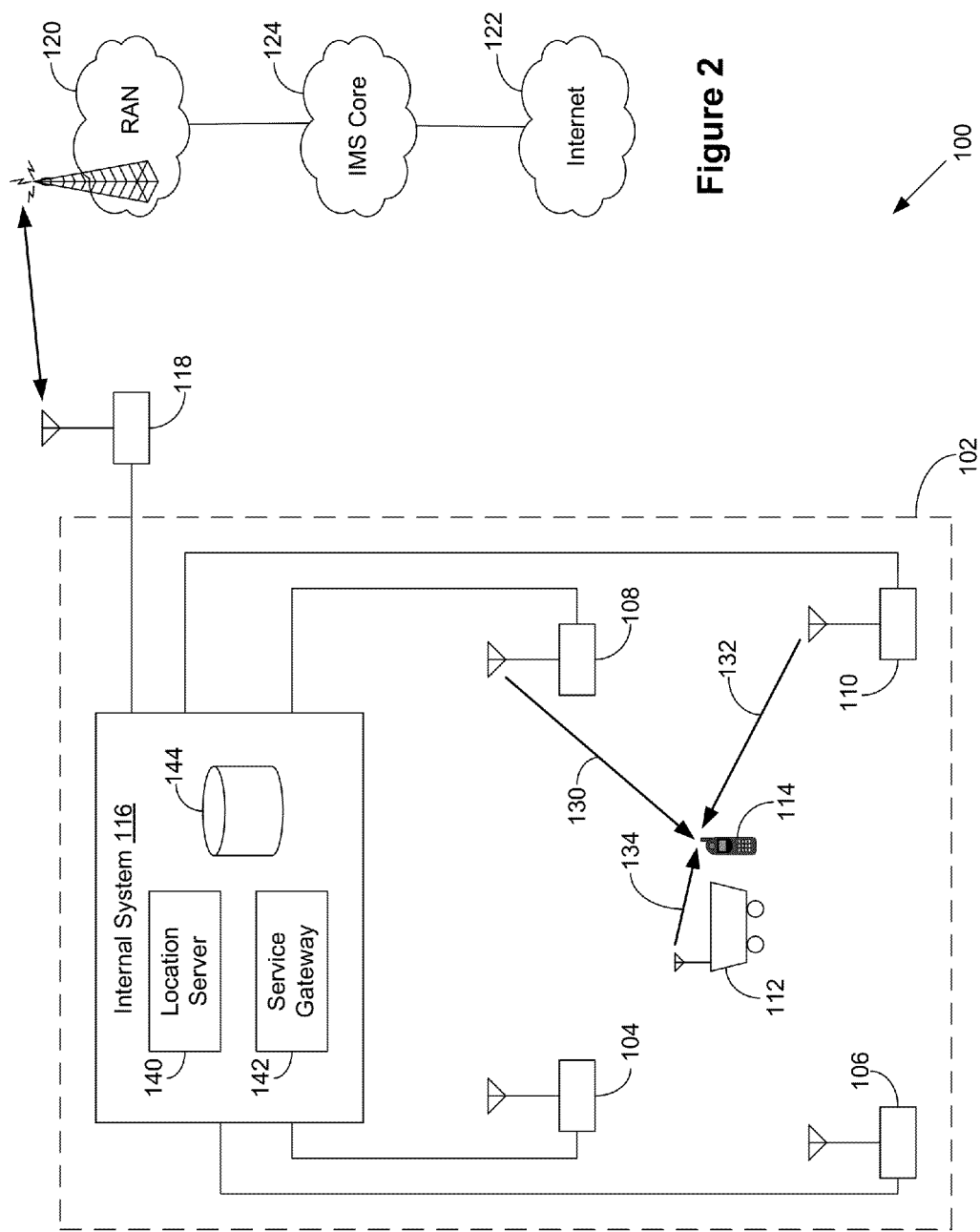
FIG. 2 is a diagram illustrating an example network that can be used for TDOA measurements, in accordance with an example embodiment.

FIG. 2 illustrates an example network 100 in which certain embodiments can be employed. In this example, network 100 includes a plurality nodes located inside of a building 102. Building 102 could be, for example, a store, a hospital, a convention center, or some other type of enclosure. The plurality of nodes includes nodes that are disposed in fixed locations, exemplified in FIG. 2 by nodes 104, 106, 108, and 110, as well as one or more nodes that are mobile, exemplified in FIG. 2 by node 112. Node 112 may be mounted on, integrated in, or otherwise operationally associated with a cart or other type of conveyance. As one example, building 102 could be a store, and node 112 could be mounted on or integrated into a shopping cart. As another example, building 102 could be a hospital, and node 112 could be mounted on or integrated into a gurney. Other examples are possible as well.

Nodes 104-112 are able to communicate with mobile devices, such as mobile device 114, using a wireless communication protocol. Mobile device 114 could be a wireless telephone, a wirelessly-equipped handheld, tablet, or laptop computer, or other type of wireless communication device. The wireless communication protocol could be, for example, 1xRTT CDMA, EVDO, IEEE 802.11 (WiFi), IEEE 802.16 (WiMAX), LTE, or other wireless protocol. A mobile device, such as mobile device 114 may use the wireless communication protocol to send or receive voice, text, data, and/or other media via one or more of nodes 104-112.

In one example, the wireless communication protocol is LTE. In that case, the locations of mobile devices may be determined according to the LTE Positioning Protocol (LPP). Aspects of LPP are described in 3rd Generation Partnership Project, "LTE; Evolved Universal Terrestrial Radio Access (E-UTRA); LTE Positioning Protocol (LPP)," 3GPP TS 36.355, version 11.0.0 (2012-10), which is incorporated herein by reference.

Nodes 104-112 in building 102 may be controlled by an internal system 116 that is located within or otherwise associated with building 102. The fixed-location nodes within building 102, such as nodes 104-110, may be communicatively coupled with internal system 116 via wired connections. The mobile nodes within building 102, such as node 112, may wirelessly communicate with internal system 116, for example, via one or more of the fixed-location nodes.

Internal system 116 may also be communicatively coupled to an external node 118 that is located outside of building 102. External node 118 may be configured to wirelessly communicate with a radio access network (RAN) 120, for example, using LTE or other wireless communication protocol. RAN 120 may, in turn, be communicatively coupled to a circuit-switched transport network, such as the public switched telephone network (PSTN), and/or to a packet-switched transport network, such as the Internet. In the example illustrated in FIG. 2, RAN 120 is communicatively coupled to Internet 122 via an IP Multimedia Subsystem (IMS) core network 124.

In LTE examples, external node 118 may be treated as an eNodeB by RAN 120. Nodes 104-110 may, in turn, communicate with RAN 120 via external node 118. Thus, nodes 104-110 may be described as "sub eNodeBs." External node 118 may also provide a time reference (e.g., based on GPS signals received by external node 118) to which fixed-location nodes 104-110 in building 102 are synchronized. However, the mobile nodes in building 102, such as mobile node 112, might not be synchronized with the time reference provided by external node 118. Thus, mobile node 112 may have a time synchronization error relative to the time reference provided by external node 118.

This time synchronization error associated with mobile node 112 can be relevant when mobile node 112 is used for TDOA measurements. In this regard, a mobile device, such as mobile device 114, may obtain TDOA measurements using wireless signals transmitted by one or more of nodes 104-112. For example, mobile device 114 may receive a wireless signal 130 transmitted by node 108, a wireless signal 132 transmitted by node 110, and a wireless signal 134 transmitted by node 112. Mobile device 114 may then obtain TDOA measurements based on any pair of these wireless signals. For example, mobile device 114 may obtain a TDOA measurement based on a difference between the propagation times of wireless signals 130 and 132 and another TDOA measurement based on a different between the propagation times of wireless signals 130 and 134. Mobile device 114 may then transmit the TDOA measurements to a location server 140, and the location server 140 may determine a location of mobile device 114 based on the TDOA measurements. In one example, location server 140 is part of internal system 116. Alternatively, location server 140 could be located outside of internal system 116. For example, location server 140 could be part of RAN 120 or IMS core network 124.

Internal system 116 may also include a service gateway 142 that can provide services to mobile devices operating within building 102, such as mobile device 114. The services provided by service gateway may involve or make use of mobile device locations determined by location server 140. For example, mobile device 114 may run an application that causes the mobile device to register with service gateway 142 when mobile device 114 enters or nears building 102. Once mobile device 114 has registered, service gateway 142 may communicate with mobile device 114 to support a location-based task in building 102, such as shopping. The location-based task may involve tracking the location of mobile device 114 using TDOA measurements that mobile device 114 transmits to location server 140. As one example, if the tracking indicates that mobile device 114 is nearing a target location, service gateway 142 may transmit a notification that causes mobile device 114 to alert the user regarding the target location's proximity. As another example, if the tracking indicates that mobile device 114 has strayed from a prescribed path, service gateway 142 may transmit a notification that causes mobile device 114 to alert the user regarding the discrepancy.

The location-based task managed by service gateway 142 may include a calibration phase to determine the time synchronization error of an unsynchronized node in building 102, such as node 112. Service gateway 142 may initiate the calibration phase by instructing mobile device 114 to scan an object, such as a bar code, and transmit the scan data to service gateway 142. In addition, either in response to the scanning or an instruction from service gateway 142, mobile device 114 may obtain TDOA measurements, for example, using wireless signals 130-134 and transmit the TDOA measurements to location server 140.

Internal system 116 may include a database 144 that includes precise locations of objects that may be scanned by mobile device 114. Thus, service gateway 142 may use the scan data from mobile device 114 to look up the location of the scanned object in database 144. The scanned object's location may provide one location estimate of mobile device 114. Location server 140 may determine another location estimate of mobile device 114 based on the TDOA measurements from mobile device 114. The distance between the two location estimates may be used to calculate a time synchronization error of an unsynchronized node involved in the TDOA measurements, such as node 112. The time synchronization error determined for the unsynchronized node may then be used by mobile device 114, location server 140, and/or service gateway 142 to correct subsequent TDOA measurements involving that unsynchronized node. The subsequent TDOA measurements may, for example, be used to track mobile device 114 as part of a location-based task managed by service gateway 142.

3. Example Methods

Figure 3:
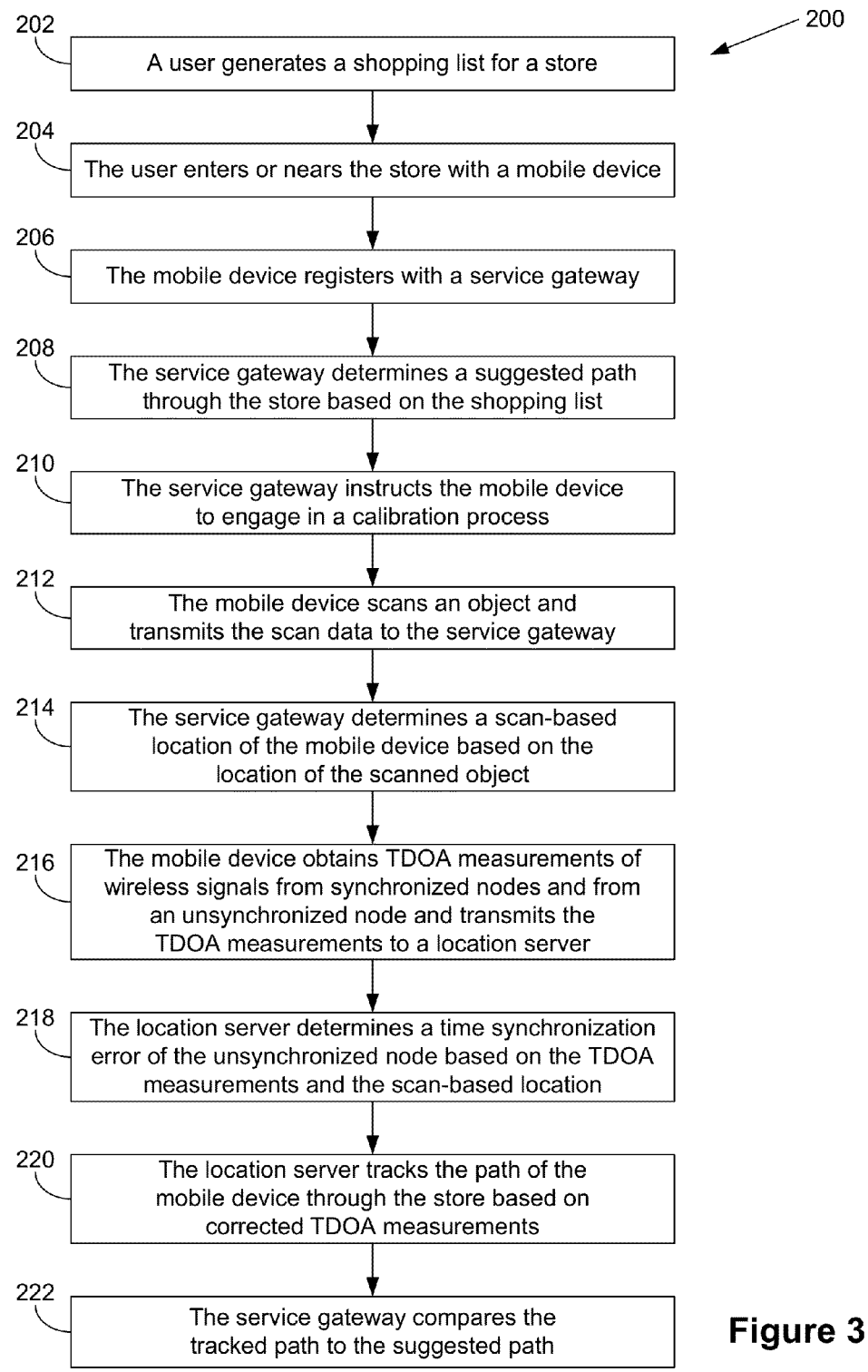
FIG. 3 is a flow chart illustrating a first method, in accordance with an example embodiment.

FIG. 3 illustrates an example method 200 that involves a location-based task managed by a service gateway and location server. In this example, the location-based task relates to shopping in a store. The store could, for example, correspond to building 102 illustrated in FIG. 2.

In method 200, a user generates a shopping list for a store, as indicated by block 202. The shopping list could be generated using a mobile device, such as mobile device 114. Alternatively, the user may generate the shopping list using a different device and then provide the shopping list to the mobile device.

As indicated by block 204, the user enters or nears the store (e.g., building 102) with the mobile device. In this example, the mobile device is running a shopping application that can guide the user through the store based on the shopping list. The shopping application can detect when the mobile device enters or nears the store and, in response, causes the mobile device to register with a service gateway associated with the store (e.g., service gateway 142), as indicated by block 206.

After registering with the service gateway, the shopping application on the mobile device may provide the shopping list to the service gateway. In response, the service gateway may determine a suggested path through the store based on the shopping list, as indicated by block 208. To develop the suggested path, the service gateway may determine where in the store each of the items in the shopping is located. To do this, the service gateway may query a database, such as database 144. The database may provide the location of each item, for example, with regard to a specific aisle in the store and a specific shelf section in the aisle. The service gateway can then determine a suggested path based on the locations of the items, so that the user can go from one item location to another in an efficient manner. The service gateway may provide the suggested path to the mobile device, and the shopping application on the mobile device may indicate the suggested path to the user.

The service gateway may also instruct the mobile device to engage in a calibration process, as indicated by block 210. For example, the shopping application on the mobile device may receive calibration instructions from the service gateway. The calibration process can be used to determine the time synchronization error of an unsynchronized node that the mobile device may use for TDOA measurements.

In response to the instruction from the service gateway, the shopping application on the mobile device may indicate to the user that the mobile device should be used to scan an object. For example, the mobile device may display on a user interface instructions to the user to scan an object using the mobile device. The instructions to the user may identify a specific object to scan, or the instructions might ask the user to scan any nearby object with a bar code. Other types of instructions to the user are possible as well.

The user may then cause the mobile device to scan an object, and the mobile device may transmit the scan data to the service gateway, as indicated by block 212. During the scanning process, the mobile device can be very close to the scanned object. For example, the scanning process may involve the mobile device optically scanning a bar code or Quick Response (QR) code on the object. Alternatively, the scanning process may involve the mobile device engaging in near field communication (NFC) with the object. Other types of scanning are possible as well.

The service gateway receives the scan data from the mobile device and determines a scan-based location of the mobile device based on the location of scanned object, as indicated by block 214. For example, the service gateway may look up the location of the scanned object in a database and may estimate the mobile device's location as being the location of the scanned object.

The mobile device also obtains TDOA measurements of wireless signals from synchronized nodes and from an unsynchronized node and transmits the TDOA measurements to a location server, as indicated by block 216. The synchronized nodes could have fixed locations. However, the unsynchronized node could be a mobile node that generally moves with the user as the user moves through the store. For example, the unsynchronized node could be mounted on or integrated into a shopping cart being used by the user. Thus, in the configuration illustrated in FIG. 2, mobile device 114 may obtain TDOA measurements from wireless signals 130 and 132 transmitted by nodes 108 and 110 (synchronized, fixed-location nodes) and wireless signal 134 transmitted by node 112 (an unsynchronized, mobile node), and mobile device 114 may transmit the TDOA measurements to location server 140.

Alternatively, both the synchronized nodes and the unsynchronized node could be fixed-location nodes. For example, the synchronized nodes might be higher power, higher accuracy devices mounted to walls or ceilings, whereas the unsynchronized nodes might be lower power, lower accuracy devices mounted on shelves. Other examples are possible as well.

The location server may determine a time synchronization error of the unsynchronized node based on the TDOA measurements provided by the mobile device and the scan-based location determined by the service gateway, as indicated by block 218. The time synchronization error may be used to correct subsequent TDOA measurements involving the unsynchronized node. In some examples, the location server may apply the correction to uncorrected TDOA measurements provided by the mobile device. Alternatively, the mobile device may apply the correction, so that the mobile device provides corrected TDOA measurements to the location server.

As the mobile device moves through the store, the location server tracks the mobile device's path based on the corrected TDOA measurement, as indicated by block 220. The TDOA measurements used for the tracking could be obtained by the mobile device automatically (e.g., every few minutes) and transmitted to the location server. Alternatively, the location server may periodically instruct the mobile device to obtain TDOA measurements. As noted above, TDOA measurements involving the unsynchronized node are corrected (either by the mobile device or the location server) based on the node's time synchronization error determined in the calibration process. By using corrected TDOA measurements, the location server may track a mobile device with sufficient accuracy to determine which aisle the mobile device (and, hence, the user) is in and at which shelf section in the aisle.

The location server may provide the tracked path of the mobile device to the service gateway. The service gateway may compare the tracked path to the suggested path, as indicated by block 222. If the comparison indicates that the tracked path has become substantially different than the suggested path, the service gateway may provide a notification to the shopping application on mobile device. The notification may cause the shopping application to indicate to the user that the user has moved away from the suggested path. The service gateway may also determine a new suggested path and provide the new suggested path to the mobile device.

In some example, the calibration process described above may be repeated multiple items as the user moves the store and uses the mobile device to scan different items. For example, each time an item is scanned, the mobile device may provide the scan data to the service gateway, and the service gateway may determine the mobile device's location based on the location of the scanned item. The scanning may also trigger the mobile device to obtain TDOA measurements and report the TDOA measurements to the location server. The location server may then use the scan-based location of the mobile device and the TDOA measurements to re-calculate the time synchronization error of the unsynchronized node, or to calculate the time synchronization error of a different unsynchronized node involved in the TDOA measurements.

Figure 4:
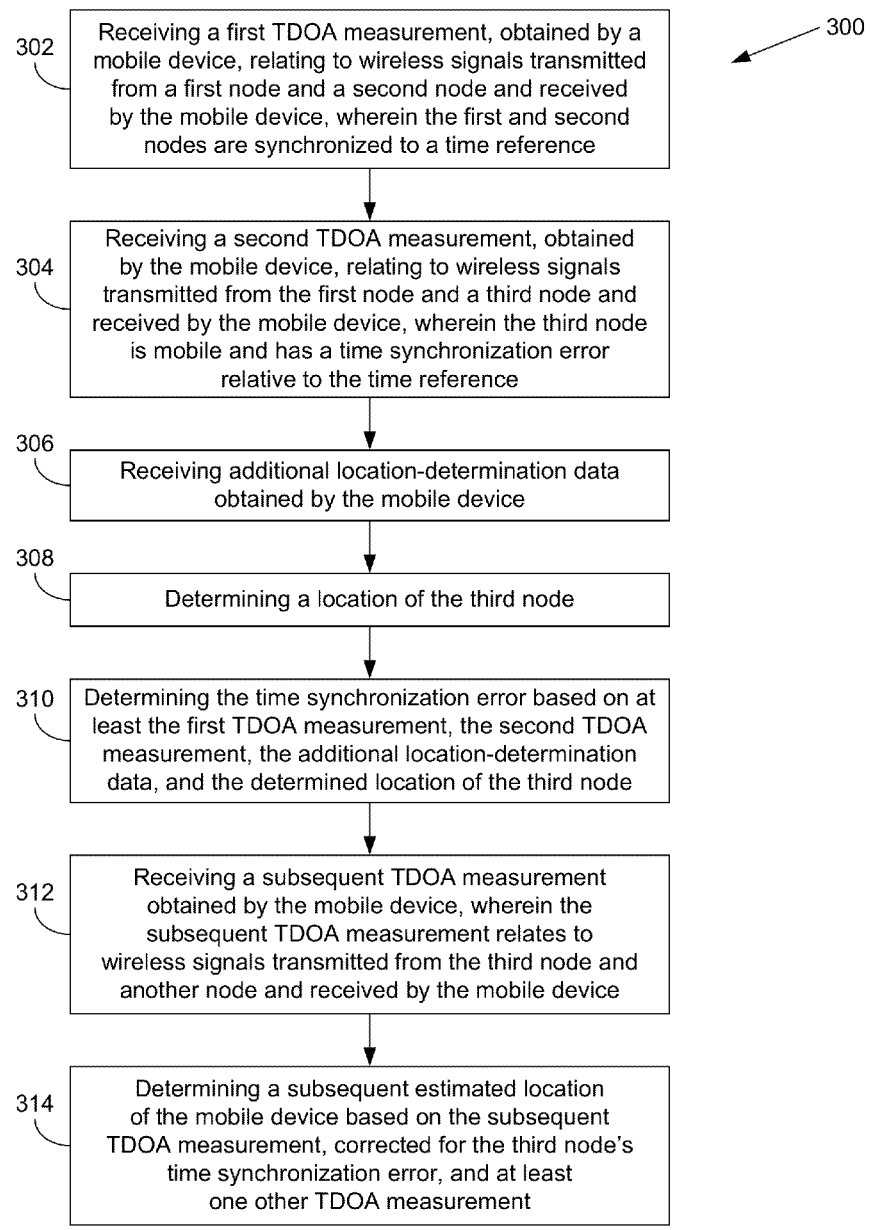
FIG. 4 is a flow chart illustrating a second method, in accordance with an example embodiment.

FIG. 4 illustrates an example method 300 in which an unsynchronized node used for TDOA measurement is mobile. For purposes of illustration, method 300 is described below as being performed by a location server (e.g., location server 140). However, it is to be understood some or all of method 300 could be performed by one or more other elements. For example, some steps of method 300 might be performed by a location server and other steps performed by one or more other elements.

Method 300 begins with the location server receiving a first TDOA measurement, obtained by a mobile device, relating to wireless signals transmitted from a first node and a second node and received by the mobile device, as indicated by block 302. The first and second nodes are synchronized to the same time reference. The location server also receives a second TDOA measurement, obtained by the mobile device, relating to wireless signals transmitted from the first node and a third node and received by the mobile device, as indicated by block 304. The third node is mobile and has a time synchronization error relative to the time reference to which the first and second nodes are synchronized. For example, with reference to FIG. 1, the first and second nodes could be nodes 108 and 110, respectively, and the third, mobile node could be node 112.

It is to be understood that in addition to the first and second TDOA measurements, the location server may receive one or more additional TDOA measurements obtained by the mobile device. The one or more additional TDOA measurements may relate to wireless signals transmitted from one or more additional nodes and received by the mobile device.

In addition to the TDOA measurements, the location server also receives additional location-determination data obtained by the mobile device, as indicated by block 306. The additional location-determination data could be any data that can be used to estimate the location of the mobile device independently of the TDOA measurements. For example, the additional location-determination data could be scan data obtained by the mobile device scanning an object. The object could include, for example, a one-dimensional or two-dimensional bar code. Other types of location-determination data are possible as well.

The first and second TDOA measurements may be used to estimate the location of the mobile device, provided that the locations of the first, second, and third nodes are known. The first and second nodes may have fixed, known locations. For example, the location server may be provisioned with the locations of the first and second nodes, or the location server may be able to look up the locations of the first and second nodes in a database (e.g., database 144). However, since the third node is mobile, the location server may take additional action to determine the location of the third node, as indicated by block 308. In one approach, the location server may determine the location of the third node based on TDOA measurements obtained by the third node. For example, the location server may determine that the second TDOA measurement obtained by the mobile device involves the third, mobile node and, in response, transmit an instruction to the third node to obtain TDOA measurements. The third node may then obtain TDOA measurements of wireless signals transmitted from other, synchronized nodes (e.g., the first and second nodes) and received by the third node. The third node may transmit the TDOA measurements to the location server, and the location server may determine the third node's location based on the TDOA measurements.

The location server may determine the time synchronization error based on at least the first TDOA measurement, the second TDOA measurement, the additional location-determination data, and the determined location of the third node, as indicated by block 310. To do so, the location server may (i) determine a first estimated location of the mobile device based on at least the first TDOA measurement, the second TDOA measurement, and the determined location of the third node (as well as the known locations of the first and second nodes), (ii) determine a second estimated location of the mobile device based on at least the additional location-determination data, and (iii) determine the time synchronization error based on a distance between the first estimated location and the second estimated location.

The first estimated location may correspond to a location where a first hyperbola defined by the first TDOA measurement intersects a second hyperbola defined by the second TDOA measurement. In some examples, the first estimated location could be further specified based one or more additional TDOA measurements obtained by the mobile device. Thus, the first estimated location may correspond to a location where multiple hyperbolas defined by multiple TDOA measurements intersect or nearly intersect.

The second estimated location of the mobile device could be determined in different ways depending on the nature of the additional location-determination data. For instance, if the additional location-determination data includes scan data relating to an object scanned by the mobile device, the location server may look up a location of the scanned object in a database (e.g., database 144) and may determine the second estimated location based on the location of the scanned object. For example, the location server may take the second estimated location of the mobile device to be the same as the location of the scanned object.

The location server may determine the third node's time synchronization error, $T_E$, based on the distance, D, between the first and second estimated locations of the mobile device, and the speed of light, c, as follows: $T_E=D/c$. The location server may store this value of $T_E$ so that the location server can correct subsequent TDOA measurements involving wireless signals transmitted from the third node. Alternatively or additionally, the location server may transmit an indication of $T_E$ to the mobile device so that the mobile device can correct TDOA subsequent TDOA measurements involving wireless signals transmitted from the third node.

Thus, the location server may receive a subsequent TDOA measurement, obtained by the mobile device, relating to wireless signals transmitted from the third node and another node (e.g., the first node or second node) and received by the mobile device, as indicated by block 312. The location server may then determine a subsequent estimated location of the mobile device based on the subsequent TDOA measurement, corrected for the third node's time synchronized error, and at least one other TDOA measurement, as indicated by block 314. The subsequent TDOA measurement could be corrected by either the location server or by the mobile device.

Figure 5:
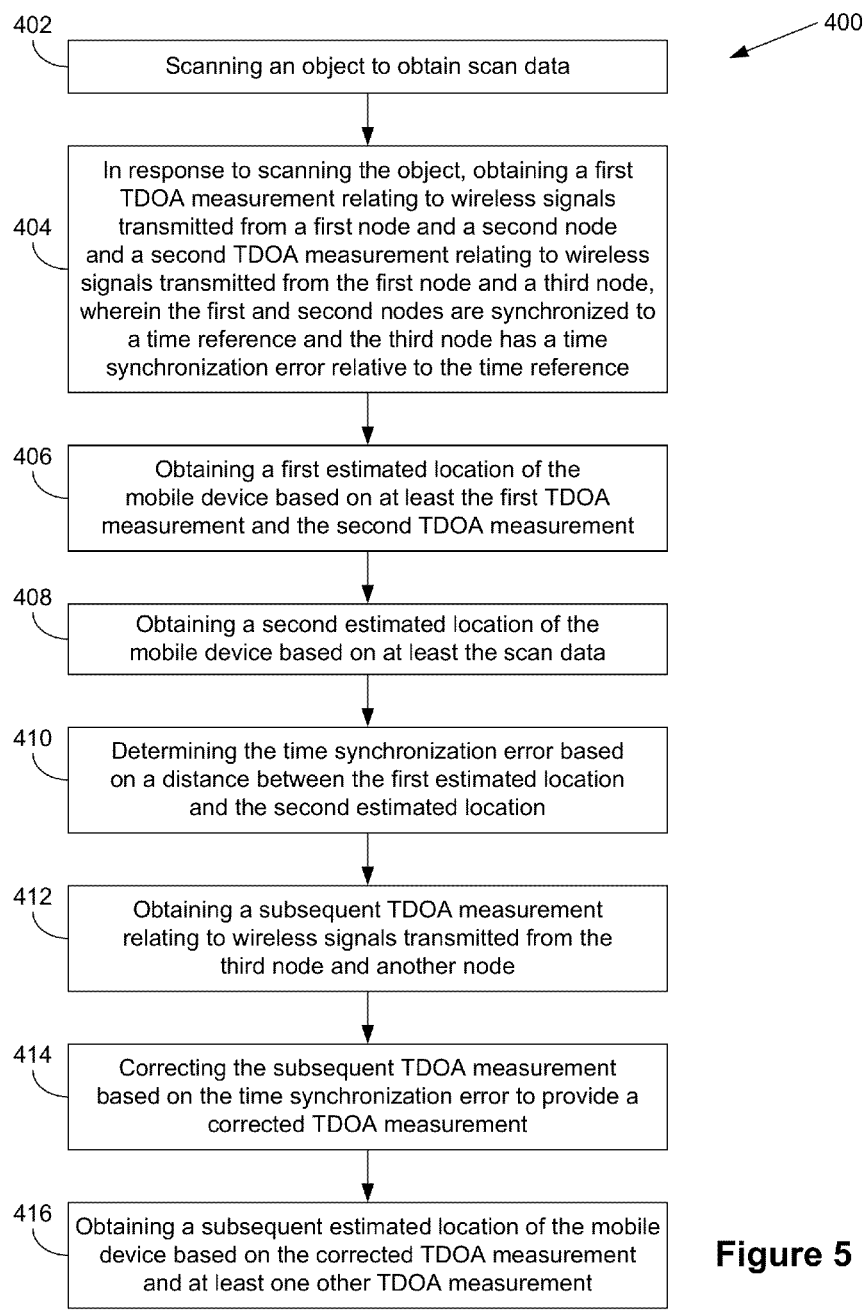
FIG. 5 is a flow chart illustrating a third method, in accordance with an example embodiment.

FIG. 5 illustrates an example method 400 in which scanning an object by a mobile device to obtain scan data triggers the mobile device to obtain TDOA measurements. For purposes of illustration, the steps in method 400 are described below as being performed by the mobile device. However, it is to be understood that some steps of method 400 might be performed by the mobile device and other steps might be performed by a location server or other element.

Method 400 begins with a mobile device scanning an object to obtain scan data, as indicated by block 402. The object could include, for example, a one-dimensional or two-dimensional bar code. In some examples, the scanning may be initiated by a user of the mobile device in order to obtain price or other information regarding an item associated with the scanned object, such as an item in a store that the user may consider purchasing. Alternatively, the user of the mobile device may initiate the scanning based on instructions relating to a calibration phase of a location-based task. The instructions may be provided via an application (e.g., a shopping application) running on the mobile device.

The scanning causes the mobile device to obtain TDOA measurements. Thus, in response to scanning the object, the mobile device obtains a first TDOA measurement relating to wireless signals transmitted from a first node and a second node and a second TDOA measurement relating to wireless signals transmitted from the first node and a third node, as indicated by block 404. The first and second nodes are synchronized to a time reference, and the third node has a time synchronization error relative to the time reference.

The mobile device obtains a first estimated location of the mobile device based on at least the first TDOA measurement and the second TDOA measurement, as indicated by block

406. To obtain the first estimated location, the mobile device may transmit the first and second TDOA measurements to a location server (e.g., location server 140) and receive the first estimated location from the location server. Thus, the location server may determine the first estimated location based on the first and second TDOA measurements obtained by the mobile device. If the third, unsynchronized node is mobile, the location server may also determine the location of the third node.

The mobile device also obtains a second estimated location of the mobile device based on at least the scan data, as indicated by block 408. To obtain the second estimated location, the mobile device may look up of a location of the scanned object in a database (e.g., database 144) and determine the second estimated location based on the location of the scanned object.

The mobile device may then determine the third node's time synchronization error based on a distance between the first estimated location and the second estimated location, as indicated by block 410. The mobile device may store the time synchronization error determined in this way so as to be able to correct subsequent TDOA measurements that may be used to determine the mobile device's location.

Thus, the mobile device may obtain a subsequent TDOA measurement relating to wireless signals transmitted from the third node and another node (e.g., the first node or second node), as indicated by block 412. The mobile device may correct the subsequent TDOA measurement based on the time synchronization error to provide a corrected TDOA measurement, as indicated by block 414. The mobile device may then obtain a subsequent estimated location of the mobile device based on the corrected TDOA measurement and at least one other TDOA measurement, as indicated by block 416. To obtain the subsequent estimated location, the mobile device may transmit the corrected TDOA measurement and the at least one other TDOA measurement to a location server and received the subsequent estimated location from the location server.

4. Example Location Server

Figure 6:
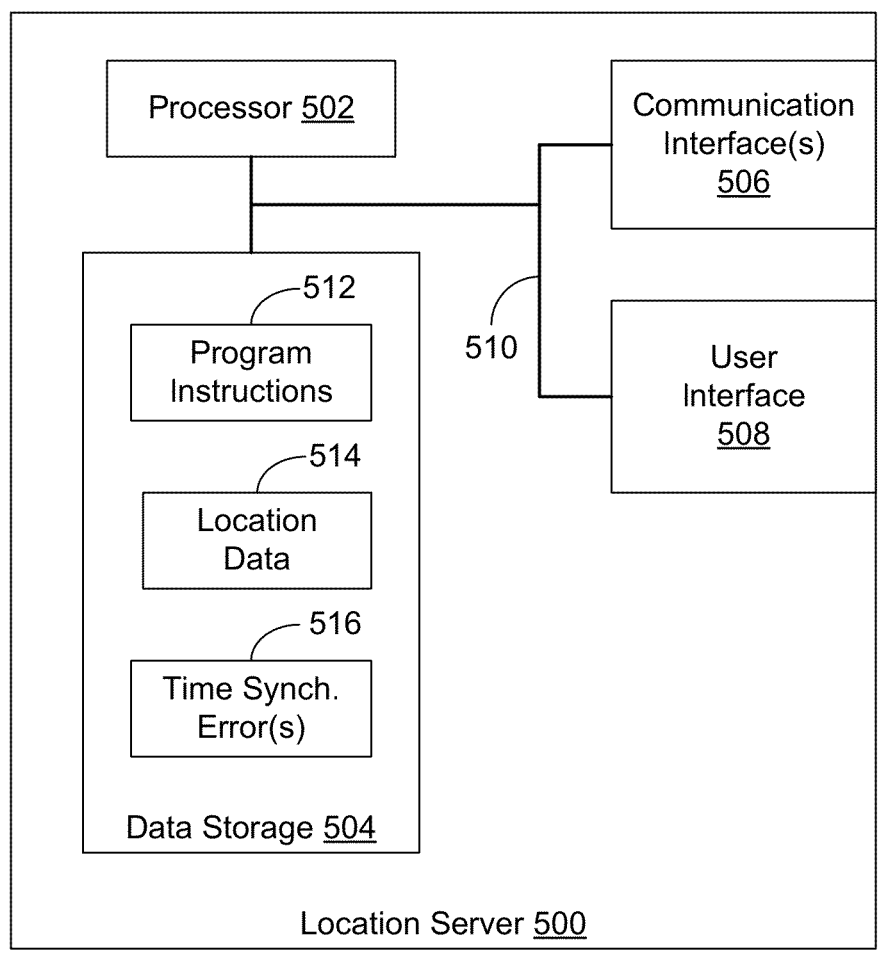
FIG. 6 is a functional block diagram of a location server, in accordance with an example embodiment.

FIG. 6 is a functional block diagram of an example location server 500. In this example, location server 500 includes a processor 502, data storage 504, one or more communication interfaces 506, and a user interface 508, all of which may be interconnected via a data bus 510 or other communication medium.

Data storage 504 is a non-transitory computer readable medium that may include, for example, volatile memory and/or non-volatile memory. Data storage 504 can store program instructions 512 that are executable by processor 502 to cause location server 500 to carry out any of the functions described herein, such as described above in connection with FIGS. 1-5. Data storage 504 may also store data for use by location server 500 when carrying out such functions. As one example, data storage 504 may store location data 514 relating to the location of nodes, scannable objects, and/or other items within a building. As another example, data storage 504 may store one or more store time synchronization errors 516 that location server 500 has determined for one or more unsynchronized nodes. Location server 500 may use the time synchronization errors 516 to correct TDOA measurements obtained using wireless signals transmitted from the unsynchronized nodes.

Communication interface(s) 506 can include any type of wired connection and/or wireless connection that enables location server 500 to communicate with one or more entities, either directly or via a communication network. For instance, location server 500 may use communication interface 506 to communicate with a mobile device via a network of nodes within a building. The communications with the mobile device could, for example, involve the location server receiving TDOA measurements from the mobile device and providing an estimated location of the mobile device based on the TDOA measurements. Location server 500 may also use communication interface 506 to communicate with a service gateway and/or one or more other network entities.

User interface 508 could include any mechanism that is able to receive input from a user, such as a keyboard, mouse, touch screen, microphone, etc., as well as any mechanism that is able to provide output to a user, such as a display screen, lights, speaker, etc.

5. Example Mobile Device

Figure 7:
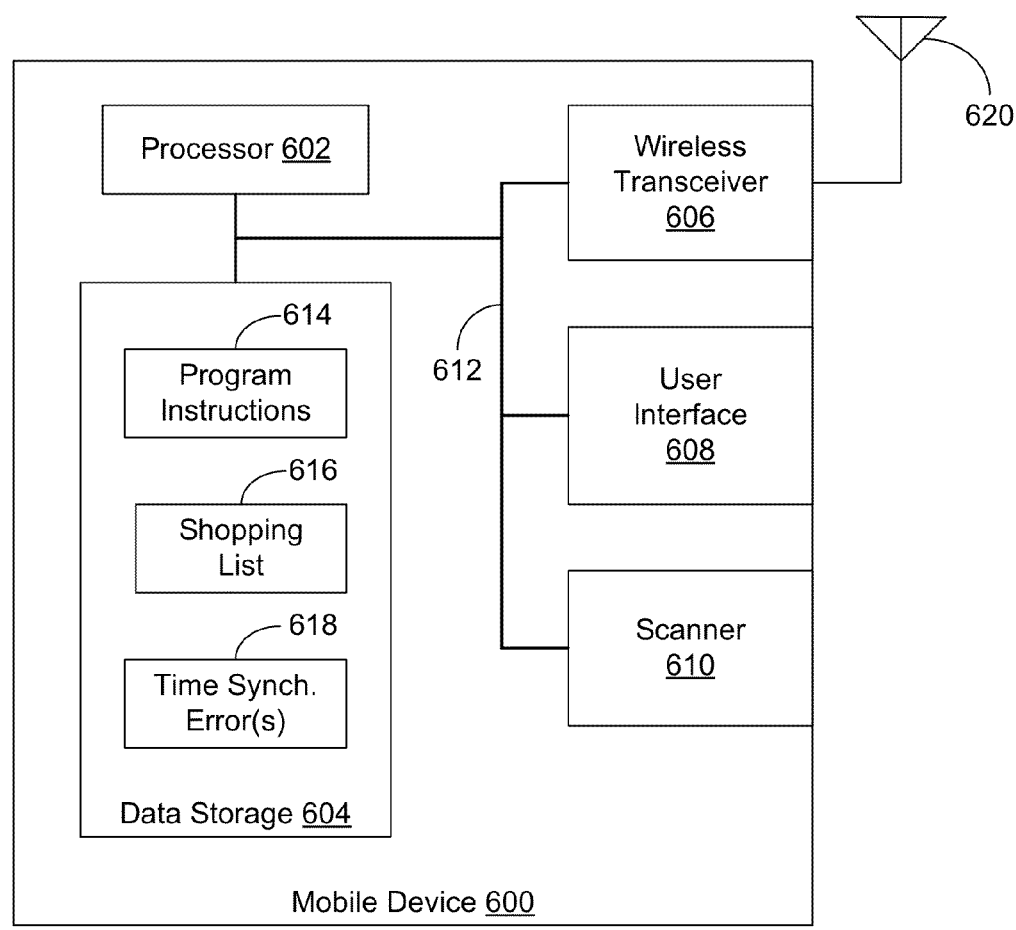
FIG. 7 is a functional block diagram of a mobile device, in accordance with an example embodiment.

FIG. 7 is a functional block diagram of an example mobile device 600. In this example, mobile device 600 includes a processor 602, data storage 604, a wireless transceiver 606, a user interface 608, and a scanner 610, all of which may be interconnected via a data bus 612 or other communication medium.

Data storage 604 is a non-transitory computer readable medium that may include, for example, volatile memory and/or non-volatile memory. Data storage 604 can store program instructions 614 that are executable by processor 602 to cause mobile device 600 to carry out any of the functions described herein, such as described above in connection with FIGS. 1-5. Data storage 604 may also store data for use by mobile device 600 when carrying out such functions. As one example, data storage 604 may store data relating to a location-based task, such as a shopping list 616. As another example, data storage 604 may store one or more time synchronization errors 618 that have been determined for one or more unsynchronized nodes. Mobile device 600 may use the time synchronization errors 618 to correct TDOA measurements obtained using wireless signals transmitted from the unsynchronized nodes.

Wireless transceiver 606 is configured to transmit and receive wireless signals from one or more nodes, via an antenna 620. Mobile device 600 may use wireless transceiver 606 to obtain TDOA measurements of such wireless signals received by wireless transceiver 606. Mobile device 600 may also use wireless transceiver 606 to transmit and receive voice, text, data or other media. For example, mobile device 600 may use wireless transceiver 606 to send and receive data relating to a location-based task. Specifically, mobile device 600 may transmit TDOA measurements, scan data, and/or other location-determination data via wireless transceiver 606, and mobile device 600 may receive instructions and notifications regarding a location-based task, as well as estimated locations via wireless transceiver 606.

User interface 608 could include any mechanism that is able to receive input from a user, such as a keyboard, a mouse, a touch screen, etc., as well as any mechanism that is able to provide output to a user, such as a display screen. For example, a user of mobile device 600 may interact with user interface 608 to cause mobile device 600 to scan an object using scanner 610 or perform other functions related to a location-based task. As well, the user may receive instructions, notifications, and information related to a location-based task via user interface 608. For instance, if the path of mobile device 600 has strayed from a suggested path for a location-based task (e.g., shopping), the mobile device 600 may provide an alert through user interface 608. The alert may include a visual component (e.g., text or graphics on a display), an auditory component (e.g., a beep or other sound), and/or a tactile component (e.g., a vibration).

Scanner 610 could include any mechanism by which mobile device 600 can scan an object proximate to mobile device 600. As one example, scanner 610 could be an optical scanner that can scan a bar code. As another example, scanner 610 could be a radio frequency (RF) device that can scan an object using, for example, radio frequency identification (RFID) protocols or near field communication (NFC) protocols. Other types of scanners are possible as well.

6. Conclusion

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method, comprising:
receiving, by a location server, a first time difference of arrival (TDOA) measurement obtained by a mobile device, wherein the first TDOA measurement relates to wireless signals transmitted from a first node and a second node and received by the mobile device, wherein the first and second nodes are synchronized to a time reference;
receiving, by the location server, a second TDOA measurement obtained by the mobile device, wherein the second TDOA measurement relates to wireless signals transmitted from the first node and a third node and received by the mobile device, wherein the third node is mobile, and wherein the third node has a time synchronization error relative to the time reference;
receiving, by the location server, additional location-determination data obtained by the mobile device, wherein the additional location-determination data relates to a one-dimensional bar code or a two-dimensional bar code;
determining, by the location server, a location of the third node; and
determining, by the location server, the time synchronization error based on at least the first TDOA measurement, the second TDOA measurement, the additional location-determination data, and the determined location of the third node.

2. The method of claim 1, wherein determining, by a location server, the time synchronization error based on at least the first TDOA measurement, the second TDOA measurement, the additional location-determination data, and the determined location of the third node comprises:
determining, by the location server, a first estimated location of the mobile device based on at least the first TDOA measurement, the second TDOA measurement, and the determined location of the third node;
determining, by the location server, a second estimated location of the mobile device based on at least the additional location-determination data; and
determining, by the location server, the time synchronization error based on a distance between the first estimated location and the second estimated location.

3. The method of claim 2, wherein determining, by the location server, a second estimated location of the mobile device based on at least the additional location-determination data comprises:
looking up a location of the object in a database; and
determining the second estimated location of the mobile device based on the location of the object.

4. The method of claim 1, wherein determining the location of the third node comprises:
receiving, by the location server, additional TDOA measurements obtained by the third node; and
determining, by the location server, the location of the third node based on at least the additional TDOA measurements.

5. The method of claim 4, wherein the additional TDOA measurements relate to wireless signals transmitted from the first and second nodes and received by the third node.

6. The method of claim 4, further comprising:
transmitting, from the location server to the third node, an instruction to obtain the additional TDOA measurements.

7. The method of claim 1, further comprising:
receiving, by the location server, a subsequent TDOA measurement obtained by the mobile device, wherein the subsequent TDOA measurement relates to wireless signals transmitted from the first and third nodes and received by the mobile device; and
determining, by the location server, a subsequent estimated location of the mobile device, based on at least the subsequent TDOA measurement and the time synchronization error.

8. The method of claim 1, further comprising:
transmitting, by the location server, an indication of the time synchronization error to the mobile device;
receiving, by the location server, a subsequent TDOA measurement obtained by the mobile device, wherein the subsequent TDOA measurement relates to wireless signals transmitted from the first and third nodes and received by the mobile device, wherein the subsequent TDOA measurement is corrected for the time synchronization error; and
determining, by the location server, a subsequent estimated location of the mobile device, based on at least the subsequent TDOA measurement.

9. A method, comprising:
scanning an object, by a mobile device, to obtain scan data, wherein the object comprises a one-dimensional bar code or a two-dimensional bar code;
in response to scanning the object, obtaining, by the mobile device, a first time difference of arrival (TDOA) measurement and a second TDOA measurement, wherein the first TDOA measurement relates to wireless signals transmitted from a first node and a second node and received by the mobile device and the second TDOA measurement relates to wireless signals transmitted from the first node and a third node and received by the mobile device, wherein the first and second nodes are synchronized to a time reference, and wherein the third node has a time synchronization error relative to the time reference;
obtaining, by the mobile device, a first estimated location of the mobile device based on at least the first TDOA measurement and the second TDOA measurement;
obtaining, by the mobile device, a second estimated location of the mobile device based on at least the scan data; and
determining, by the mobile device, the time synchronization error based on a distance between the first estimated location and the second estimated location.

10. The method of claim 9, wherein obtaining, by the mobile device, a first estimated location of the mobile device based on at least the first TDOA measurement and the second TDOA measurement comprises:
- transmitting, by the mobile device, the first TDOA measurement and the second TDOA measurement to a location server;
- receiving, by the mobile device, the first estimated location of the mobile device from the location server.

11. The method of claim 10, further comprising:
- obtaining, by the mobile device, a subsequent TDOA measurement, wherein the subsequent TDOA measurement relates to wireless signals transmitted from the first and third nodes and received by the mobile device;
- correcting, by the mobile device, the subsequent TDOA measurement based on the time synchronization error to provide a corrected TDOA measurement;
- transmitting, by the mobile device, the corrected TDOA measurement to the location server; and
- receiving, by the mobile device, a subsequent estimated location of the mobile device from the location server.

12. The method of claim 9, wherein obtaining, by the mobile device, a second estimated location of the mobile device based on at least the scan data comprises:
- looking up a location of the object in a database; and
- determining the second estimated location of the mobile device based on the location of the object.

13. The method of claim 9, wherein the first node, second node, and third node are located in a building.

14. The method of claim 13, wherein the third node is operationally associated with a conveyance movable by a user of the mobile device.

15. A system, comprising:
- a processor;
- data storage;
- program instructions stored in the data storage and executable by the processor to cause the system to perform functions comprising:
  - (a) obtaining a first time difference of arrival (TDOA) measurement, wherein the first TDOA measurement relates to wireless signals transmitted from a first node and a second node and received by a mobile device, wherein the first and second nodes are synchronized to a time reference;
  - (b) obtaining a second TDOA measurement, wherein the second TDOA measurement relates to wireless signals transmitted from the first node and a third node and received by the mobile device, wherein the third node is mobile, and wherein the third node has a time synchronization error relative to the time reference;
  - (c) obtaining scan data relating to a scan of an object by the mobile device, wherein the object comprises a one-dimensional bar code or a two-dimensional bar code;
  - (d) obtaining a first estimated location of the mobile device based on at least the first TDOA measurement and the second TDOA measurement;
  - (e) obtaining a second estimated location of the mobile device based on at least the scan data; and
  - (f) determining the time synchronization error based on a distance between the first estimated location and the second estimated location.

16. The system of claim 15, wherein the processor and data storage are in the mobile device, and further comprising:
- a scanner for obtaining the scan data; and
- a wireless transceiver, wherein the wireless transceiver is configured to receive the wireless signals transmitted from the first node, second node, and third node and is configured to transmit the scan data, the first TDOA measurement, and the second TDOA measurement.

17. The system of claim 15, wherein the processor and data storage are physically separate from the mobile device, and further comprising:
- a network interface for receiving the first and second TDOA measurements from the mobile device via a communication network.

* * * * *